Feb. 20, 1973   V. PETROVICH ET AL   3,717,712
DEVICE FOR HOLDING AND LONGITUDINAL DISPLACING OF ELECTRODE
Filed May 18, 1971   4 Sheets-Sheet 1

3,717,712
DEVICE FOR HOLDING AND LONGITUDINAL
DISPLACING OF ELECTRODE
Viktor Petrovich Zinkovsky, ulitsa Zorge 123, kv. 48;
Nariman Alexandrovich Sukoian, ulitsa Pamirskaya 48,
kv. 78; Vladimir Fedorovich Alyanov, ulitsa Stepnaya
225; and Jury Fedorovich Frolov, prospek k. Marxa
8/2, kv. 70, all of Novosibirsk, U.S.S.R.
Filed May 18, 1971, Ser. No. 144,562
Int. Cl. H05b 7/12
U.S. Cl. 13—15
9 Claims

ABSTRACT OF THE DISCLOSURE

The present invention relates to the industrial electric furnaces and more particularly it relates to the devices for holding and longitudinal displacing of the electrode.

The device for holding and longitudinal displacing of the electrode is characterized in that it has at least three friction clamps fitting around the electrode and clamping it, said clamps moving along the electrode with relation to the frame; each friction clamp is provided with an individual power drive for moving it along the electrode, said drive being supplied from the working medium distributor; said working medium distributor ensures independent control of the forward and reverse travel of each power drive.

---

The present invention relates to industrial electric furnaces and more particularly it relates to the devices for holding and longitudinal displacing of electrodes.

Known in the art is a device for holding and longitudinal displacing of electrodes comprising two friction clamps gripping the electrode, one of these clamps being rigidly fixed on the electrode suspension crosshead while the second one is moved up and down with the aid of power cylinders with relation to the first clamp. Both friction clamps are permanently applied by their springs. When the power cylinders displace the movable clamp upward overcoming the force of friction occasioned between the clamp and the electrode, the latter stays still being held by its own weight and by the fixed clamp. During the reverse downward stroke of the power cylinders the force of friction between the movable clamp and the electrode is added to the gravity force of the electrode so that the latter is forced down overcoming the force of friction between said electrode on the one hand and the fixed friction clamp and the electric contact unit located still farther down, on the other. This lengthens the lower working tip of the electrode, i.e. the electrode is shifted longitudinally down.

The known device is characterized by a number of essential disadvantages.

Firstly, it cannot ensure the possibility of shortening the working tip of the electrode, i.e. displacing the electrode upward from the electric contact unit. The necessity for such an operation may arise during furnace repairs, while withdrawing the remaining length of the electrode from the furnace bath, also when the electrode has been inadvertently displaced too much down.

Secondly, the known device is insufficiently reliable from the standpoint of preventing damage caused to the electrode by the friction clamps.

The fact is that the friction force applied to the electrode by the movable clamp in the known device is approximately equal to two-thirds of the electrode weight. True, if the second clamp creates a friction force equal to one-third of the electrode weight then both clamps will be sufficient for holding the electrode reliably suspended. During the upward travel the movable clamp will slide over the electrode while during the downward travel it will both push the electrode through the fixed clamp and impart to the electrode an additional force required for forcing it through the electric contact unit. As the coefficient of friction during the sliding of the clamp over the electrode is approximately equal to 0.15, the required force applied by the movable clamp to the electrode proves to be four and more times greater than the weight of the electrode.

Taking into account that the weight of the electrode in large electric furnaces runs as high as several tens of tons it must be feared that the movable clamp which compresses the electrode with a force several times greater than its weight may damage the electrode if it encounters some irregularities or projections on the electrode surface which are always present on the joint between the electrode sections. Thus, the second serious disadvantage of the known device for holding and longitudinal displacing of the electrode consists in that the electrode must possess a very high strength and a high surface finish otherwise it may be broken.

An object of the present invention is to eliminate the above disadvantages.

The main object of the invention is to provide a device for holding and longitudinal displacing of the electrode which would ensure reliable holding and longitudinal displacing of the electrode in both directions and reduce the concentrations of loads on the irregularities and projections of the electrode surface by increasing the number of independently moving clamps with simultaneous reduction of the force applied by each individual clamp and simplification of the drive design.

This object is accomplished by providing a device for holding and longitudinal displacing of the electrode in which, according to the invention, there are not less than three clamps provided, each, with an individual power drive for moving it along the electrode with relation to the frame and in which the distributor of the working medium ensures independent control of the forward and reverse stroke of each power drive.

It is expedient that the frame and friction clamps should be made with circular flanges and the flanges of each friction clamp should be placed between the frame flanges and provided on top and bottom with flexible cushions connected, each, to the working medium distributor.

It is expedient that the working medium distributor should be made in the form of a casing with a common sealed chamber for the supply of the working medium, the cover of this chamber having three holes for the operation of the power drive of each friction clamp and that the chamber should accommodate control valves whose number should be equal to the number of the friction clamps; it is also expedient that the casing of the distributor should accommodate two groups of cylinders operating the control valves and arranged symmetrically with the chamber; the piston of each cylinder in one group should be connected with the piston of the symmetrical cylinder in the other group by a rod whose middle part should be connected to one of the control valves; the above-piston chambers of the cylinders in each group should be interconnected in series by channels while the under piston chambers of the cylinders in each group should be interconnected by channels in parallel.

Besides, it is expedient that the casing of the working medium distributor should accommodate two auxiliary two-position control valves connected, each, by channels with the above-piston space of one cylinder in one group and with under-piston spaces of all the cylinders of the same group and with the channels for letting the working medium in and out.

It is expedient that the casing of the working medium distributor should have two channels, each ensuring the supply of the working medium to the distributor chamber and to one of the auxiliary two-position control valves, with return valves provided at the inlet openings of said channels in the distributor chamber.

For operating the auxiliary two-position control valves at the extreme working positions of the friction clamp, it is practicable that each auxiliary control valve should be mechanically linked with one of the friction clamps.

It is expedient that the casing of the working medium distributor be provided with a device for operating the control valves made in the form of a rod with a spring wound on it, one end of the rod being connected to the control valve and the other resting on a cam, the number of the rods and cams being equal to the number of the control valves and it is expedient that all the cams be mounted on a common rotating shaft; besides, each cam should have two circular cylindrical edges and two identical interconnecting edges between the cylindrical edges; one of the interconnecting edges in all the cams should be arranged similarly in space with relation to the shaft axis and the lengths of the cylindrical edges of all the cams should be different.

The proposed device for holding and longitudinal displacing of the electrode ensures a high reliability in holding the electrode due to the fact that the electrode is constantly clamped by all the spring-loaded friction clamps which are never released during operation of the device. At the same time the claimed device ensures longitudinal displacing of the electrode both in the direction of lengthening its working tip and in the reverse direction.

The device is utterly simple to operate. Once the supply of the working medium has been turned on, it performs automatically all the motions required for displacing the electrode.

The proposed device reduces the load applied to the electrode by the friction clamp a few times as compared with the known devices and can, therefore, be especially useful in the electric furnaces where the electrode strength is reduced for some reason, for example in furnaces with large diameter self-sintering electrodes (Soderberg electrodes).

The proposed device is simple in manufacture, operation and repairs since its power drives have no friction parts and movable seals.

The working medium of the proposed device can be constituted by compressed air supplied from the shop air system for powering pneumatic tools, thereby dispensing with the necessity for laying additional pipes on the shop premises for high-pressure working medium.

Now the invention will be described in detail by way of examples with reference to the accompanying drawings, in which.

Figure 1:
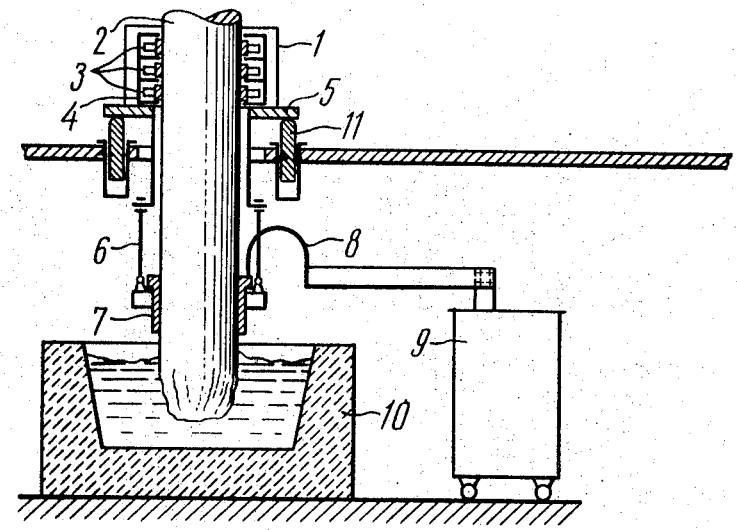
FIG. 1 shows the arrangement of the device for holding and longitudinal displacing of the electrode in an electric furnace with relation to the other parts of said furnace, sectionalized.

As can be seen from FIG. 1, the device 1 for holding and longitudinal displacing of the electrode has friction clamps 3 installed in a frame 4 and gripping the electrode 2. The frame 4 is mounted on a crosshead 5 and is fastened to it, for example, by bolts. Suspended from the crosshead 5 on spindles 6 is an electric contact unit 7 connected by flexible current conductors 8 with a furnace supply transformer 9. The working tip of the electrode 2 (located below the electric contact unit 7) is lowered into the furnace bath 10. The crosshead 5 rests on a hydraulic lift 11 which lifts and lowers the electrode 2 in the process of adjusting the power supplied to the electric furnace.

The frame 4 of the device 1 for holding and longitudinal displacing of the electrode 2 consists of circular flanges 12 (FIGS. 2, 3, 4) secured by bolts 13 and fixed at certain distances from one another by spacer bushings 14. The friction clamps 3 (FIG. 1) consist of sectors 15 (FIGS. 2, 3, 4) whose external surface has projections forming circular flanges 16; the sectors 15 are compressed into rings by springs 17 and press the electrode 2 by their internal surface. The sectors 15 can be made of cast iron, steel, or some other strong and wear-resistant metal. However, in order to reduce the load on the electrode 2, ensure electrical insulation between the device 1 and the electrode 2, and to diminish the weight of the device, it is preferable that the sectors 15 should be made of a mechanically strong electric insulating material having a higher coefficient of friction than the material of the electrode 2, e.g. a plastic reinforced by fiber glass. The flexible circular cushions 18 are placed between the adjacent flanges 12 and 16 so that said cushions 18 are flattened and, being filled with a working medium, e.g. compressed air, transmit pressure to the flanges 12 and 16 between which they are flattened.

The cushions 18 are made of a flexible, strong and low-stretching material, such as nylon or rubber-canvas fabric. For letting compressed air into, and out of, the cushions 18, each cushion is connected by a pipe 19 with the working medium distributor 20 which is supplied with compressed air from some external source, for example, from a conventional compressed air system provided in shops for powering hand pneumatic tools.

Figure 2:
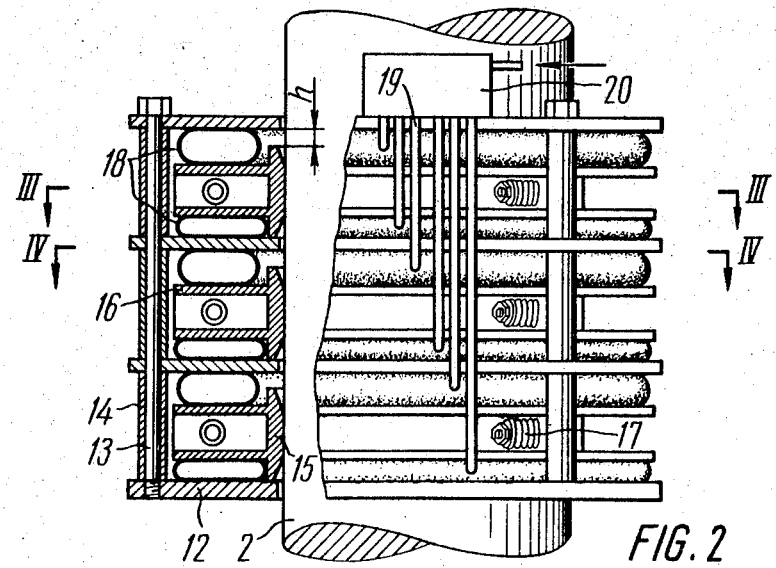
FIG. 2 is a partial section of the device for holding and longitudinal displacing of the electrode.
Figure 3:
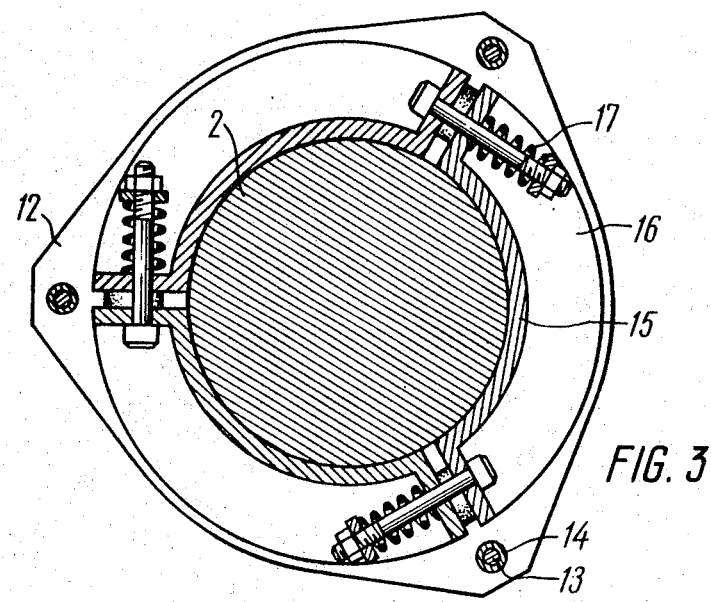
FIG. 3 is a section taken along line III—III in FIG. 2.
Figure 4:
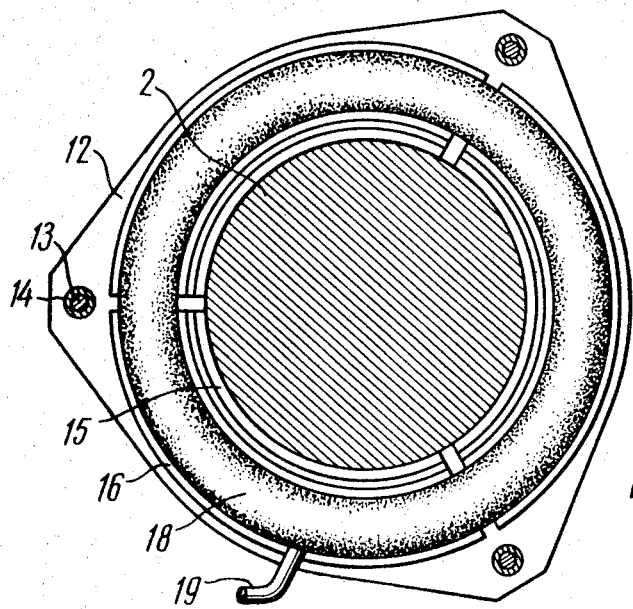
FIG. 4 is a section taken along line IV—IV in FIG. 2.

The distributor 20 (FIG. 2) consists of a casing 21 (FIG. 5) accommodating a sealed chamber 22 with holes 23 in its lower cover. The holes 23 are arranged three in a row for each friction clamp 3 (FIG. 1). The end holes 23 (FIG. 5) are used for communication with the flexible cushions 18 through pipes 19 (FIGS. 2 and 4). Let us designate the interconntected holes 23 (FIG. 5) and flexible cushions 18 by the same letters a, b, c and A, B, C. The middle hole of each three holes 23 communicates the chamber 22 with the atmosphere. Compressed air is supplied into the sealed chamber 22 through channels 24 and 25 connected to some external source of air supply. It is understood that air fed into the channel 24 will shift the electrode 2 down while the air fed into the channel 25 will shift it up.

Inside the chamber 22 there are flat control valves 26 which, being moved to the extreme working positions, connect one of the end holes 23, for example A with the middle hole 23, i.e. with the atmosphere while the second end hole 23, in this case a admits compressed air from the sealed chamber 22 through pipes 19 into the corresponding flexible cushion 18, in this case a. The control valve 26 is moved by the rod 27 which reciprocates through the walls of the chamber 22; the points where the rod 27 slides in and out are provided with seals, e.g. of the gland type (not shown in FIG. 5). Located symmetrically on both sides of the chamber 22 are cylinders 28 accommodating pistons 29 which are connected in pairs with the rods 27.

The above-piston spaces d, e, f and D, E, F of the cylinders 28 are connected in series by the channels 30 so that compressed air is admitted from one cylinder 28 into another only after the piston 29 has moved in it to the extreme position towards the sealed chamber 22. The under-piston spaces K of all the cylinders 28 located on one side of the chamber 22 are interconnected in parallel by the channel 31 in such a manner that, when compressed air is fed into the channel 31, this air enters virtually simultaneously into the under-piston spaces K of all the cylinders 28 located on one side of the chamber 22. The diameter of the holes 32 is very small as compared with that of the channels 30 and 31 so that the air compressed in the above-piston spaces of the cylinders 28 escapes into the atmosphere at a slow rate. The casing 21 also has two cylindrical valve spaces 33 accommodating the auxiliary two-position control valves 34 which control the supply of air into cylinders 28. Channels 35 communicate one valve space 33 with the compressed air supply channel 25 and the other valve space 33, with the channel 24. The channels 36 and 37 communicate each valve space 33 with the cylinders 28 whereas channels 38 and 39 communicate valve spaces 33 with the atmosphere. The auxiliary two-position control valves 34 are moved by spindles 40 and an arm 41 which articulate said valves 34 with one of the friction clamps 3 so that, on moving of said clamp 3 to the extreme working positions, the auxiliary two-position control valves 34 come alternately to their opposite extreme working positions. At the inlet into the chamber 22 the compressed air supply channels 24 and 25 are provided with non-return valves 42.

Figure 6:
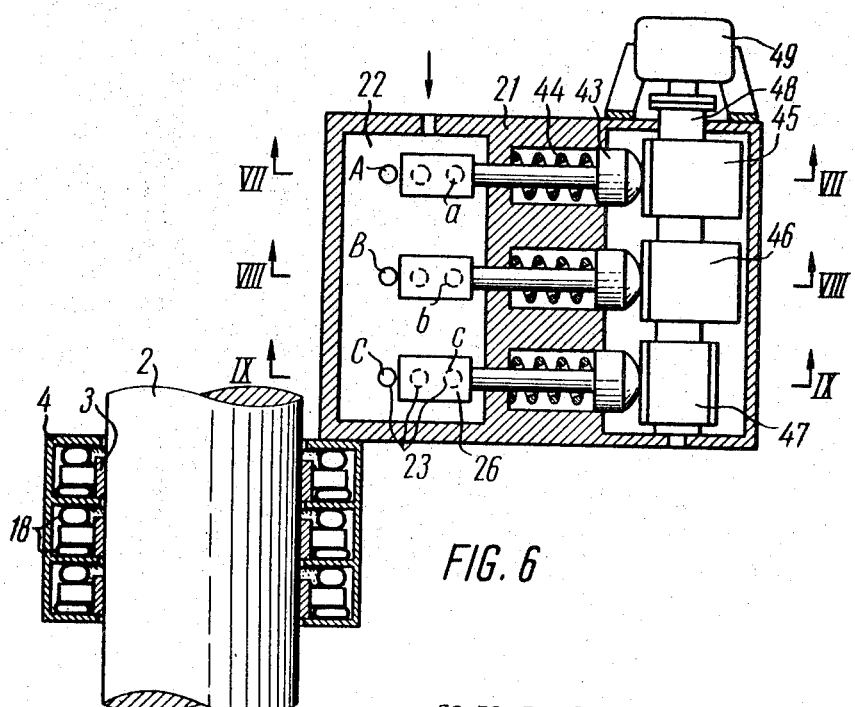
FIG. 6 shows another embodiment of the device for holding and longitudinal displacing of the electrode.

Another embodiment of the proposed device can comprise cam-operated control valves 26. In this case the control valves 26 are connected with rods 43 (FIG. 6) and moved to one of the extreme positions by springs 44. The free ends of the rods 43 rest on the cams 45, 46, 47 mounted on a shaft 48. The shaft 48 with the cams 45, 46, 47 is rotated by a drive 49 which ensures slow rotation in either direction.

Figure 7:
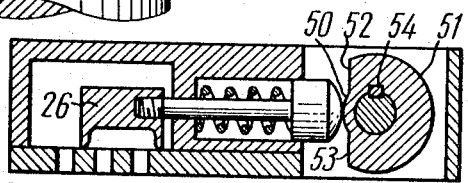
FIG. 7 is a section taken along line VII—VII in FIG. 6.
Figure 8:
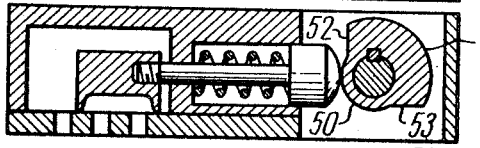
FIG. 8 is a section taken along line VIII—VIII in FIG. 6.
Figure 9:
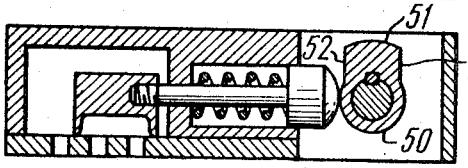
FIG. 9 is a section taken along line IX—IX in FIG. 6.

Each of the cams 45, 46, 47 has two circular cylindrical edges 50 and 51 and two identical interconnecting edges 52 and 53 (FIGS. 7, 8, 9).

The cams 45, 46, 47 are secured on the shaft 48 by a key 54.

The claimed device for holding and longitudinal displacing of the electrode may have its control valves 26 moved either by the rods 27 with the pistons 29 or by the rods 43 with the cams 45, 46 and 47 mounted on the rotating shaft 48. In both cases the efficiency of the device remains the same.

To simplify the drawings and facilitate operation of the proposed device we deal here with an example of its embodiment with the least number of the friction clamps 3, namely with three friction clamps. This version of the device is feasible in some particular cases when low manufacturing cost of such a device comprising a minimum number of parts does not interfere with the requirements of a particular type of service.

Figure 5:
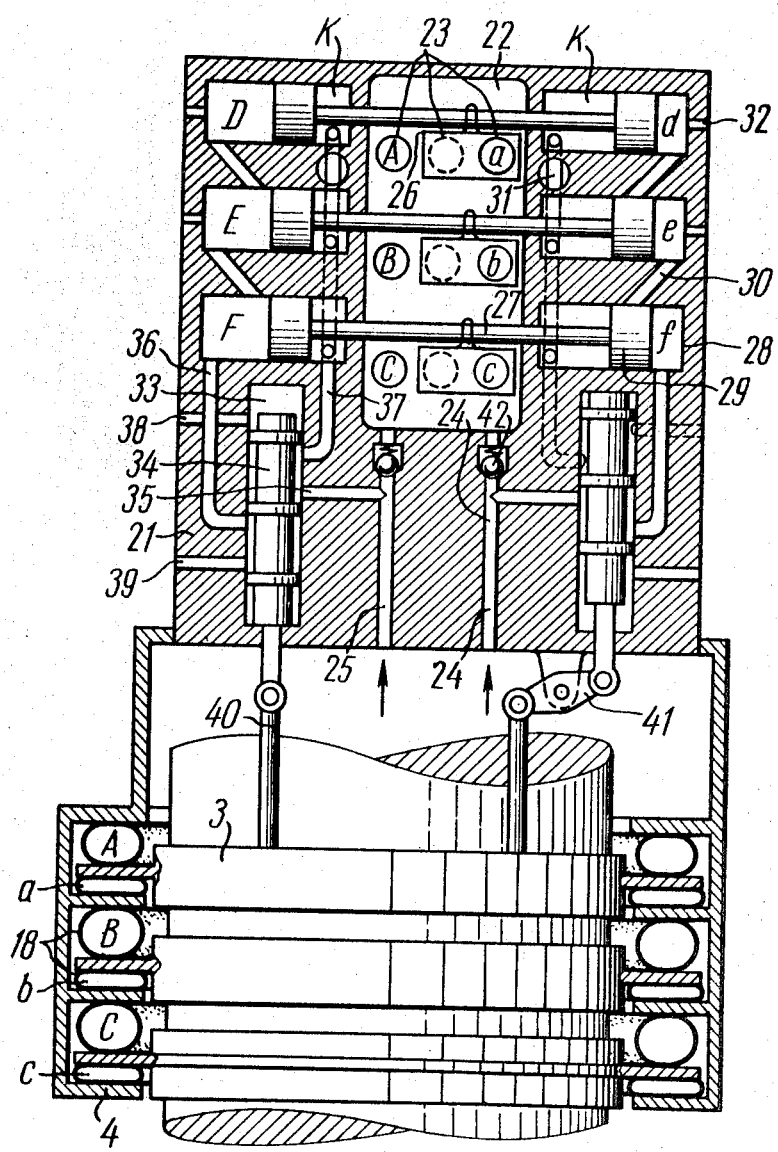
FIG. 5 shows the device for holding and longitudinal displacing of the electrode with cylinders for operating the control valves, a mechanical linkage between two-position auxiliary control valves, and one of the friction clamps, sectionalized.

Now we shall consider the functioning of the proposed device 1 (FIG. 1) with three friction clamps 3 for such a particular case when strength of the electrode 2 may be overlooked, for example, due to great thickness of the metal casing and when it is necessary to ensure holding and displacing of the electrode in absence of the guaranteed holding force of the electric contact unit 7. In this case the springs 17 (FIGS. 2, 3) must be compressed to such a degree that the friction between one friction clamp 3 and the surface of the electrode 2 would be approximately equal to the weight of said electrode 2. As long as there is no compressed air supply into the channels 24 or 25 (FIG. 5), the electrode 2 (FIG. 1) remains fixed with relation to the frame 4, crosshead 5 and electric contact unit 7. If it is necessary to displace the electrode 2 down for retaining the constant length of its working tip, compressed air must be fed into the channel 24 (FIG. 5). Passing through the non-return valve 42, compressed air fills the chamber 22 and flows through the holes 23 designated A, B, C and through the pipes 19 into the flexible cushions 19 likewise designated A, B, C. At this stage all the friction clamps 33 stay in the downmost position. Simultaneously, compressed air flows from the channel 24 through the channel 35, valve space 33 and channel 36 into the above-piston space of the cylinder 28–f and moves the piston 29 to the left together with the rod 27 and the control valve 26. The hole 23–c is connected through the control valve 26 with the middle hole 23, i.e. with the atmosphere, whereas the hole 23–C communicates with the chamber 22 and compressed air flows into the flexible cushion 18–C. At this moment the flexible cushion 18–c communicates with the atmosphere so that it exerts no appreciable pressure on the flange 16 (FIG. 4) of the friction clamp 3 on which it rests. Being inflated with compressed air, the cushion 18–c (FIG. 5) shifts the adjoining friction clamp 3 upward through a distance $h$ (FIG. 2), overcoming the force of friction between said clamp 3 and the electrode 2. The electrode 2 remains stationary. Meanwhile, compressed air flows from the above-piston space of the cylinder 28–f (FIG. 5) through the channel 30 into the above-piston chamber of the cylinder 28–e, moves the piston 29 and admits compressed air into the flexible cushion $b$, at the same time putting the flexible cushion 18–B in communication with the atmosphere. As the flexible cushion 18–b is gradually filled with compressed air, it lifts the adjoining friction clamp 3, as described above, also through a distance $h$ (FIG. 2). The compressed air flows from the above-piston space of the cylinder 28–e (FIG. 5) through the channel 30 into the above-piston space of the cylinder 28–d and shifts the piston 29; as a result, the compressed air fills the flexible cushion 18–a and lifts the adjoining friction clamp 3 also through a distance $h$.

The spindle 40 connected with arm 41 goes up and operates the auxiliary two-position control valve 34. The compressed air flows from the channel 24 through the channel 35, valve space 33 and channel 31 simultaneously into the under-piston spaces $k$ of the cylinder 28, shifting their pistons 29 all the way to the right. The flexible cushions 18 $a$, $b$, $c$ are then communicated with the atmosphere while the flexible cushions A, B, C communicate simultaneously with the chamber 22 which results in simultaneous filling of the cushions 18 A, B, C with compressed air and simultaneous downward displacement of all the friction clamps 3 (FIG. 2) together with the clamped electrode 2 through a distance $h$. As soon as the friction clamp 3 mechanically linked with the auxiliary two-position control valve 34 (FIG. 5) comes to its downmost position, the control valve 26 will also occupy its original position, the downward displacing cycle of the electrode 2 will be completed after which it will be repeated automatically as long as the compressed air is supplied into the inlet channel 24.

For displacing the electrode 2 upward, compressed air is supplied from an external source into the channel 25 (FIG. 5), wherefrom it flows through the non-return valve 42 into the chamber 22 and flexible cushions 18–A, B, C. Simultaneously, the compressed air is fed through the corresponding channels 35 and 37 into all the under-piston spaces K of the cylinders 28, moving the pistons 29 all the way to the left. This is accompanied by simultaneous displacing of the control valves 26 and communication of the flexible cushions 18–A, B, C with the atmosphere while the flexible cushions $a$, $b$, $c$ are being filled with compressed air from the chamber 22. All the friction clamps 3 (FIG. 2) with the clamped electrode 2 move upward through a distance $h$ and the spindle 40 (FIG. 5) operates the auxiliary two-position control valve 34; as a result, compressed air flows from the channel 35 into the channel 36 and further into the above-piston space F of the cylinder 28 moving its piston 29 all the way to the right. This communicates the flexible cushion 18–c with the atmosphere while the flexible cushion 18–C is filled with compressed air which moves the friction clamp 3 down through a distance $h$. The electrode 2 (FIG. 1) remains immovable with relation to the electric contact unit 7, crosshead 5 and frame 4 because it is held suspended by the remaining two-friction clamps 3. Then the compressed air passes successively from the above-piston space F (FIG. 5) of the cylinders 28 into the above-piston spaces E and D, moving the pistons 29 to the right and ensuring successive movement of the other friction clamps 3 to the lower position. When the auxiliary two-position control valve 34 connected by the spindle 40 with the friction clamp 3 moves to the lower (initial) position this completes the cycle of displacing the electrode 2 (FIG. 2) upward through a distance $h$ after which the next cycle is automatically started. The upward displacing cycle of the electrode 2 will be repeated automatically as long as the compressed air is supplied into the inlet channel 25.

The proposed device can be realized with cam-operated control valves 26 (FIGS. 6, 7, 8, 9) in which case the electrode will be shifted only after switching on the drive 49 which rotates the cam mechanism 48. In this case, for moving the electrode 2 down it is necessary to feed compressed air from an external source into the chamber 22 and to switch on the drive 49 for rotating the shaft 48 clockwise. Then the rods 43 pressed against the cams 45, 46, 47 by the springs 44 will come one after another, off the cylindrical circular edge 51, move over the interconnecting edge 53 and onto the cylindrical circular edge 51; the control valves 26 (FIG. 5) will then move, one after another, to the extreme left position, ensuring successive filling of the flexible cushions 18–a, b, c and, correspondingly, successive upward movement of all the friction clamps 3 overcoming the friction against the immovable electrode 2 (FIG. 2). Then all the rods 43 (FIGS. 6, 7, 8, 9) will move simultaneously over the interconnecting edge 52 onto the cylindrical edge 5I, the control valves 26 (FIG. 5). will move simultaneously all the way to the right, the flexible cushions 18–a, b, c will communicate simultaneously with the atmosphere while the flexible cushions 18–A, B, C will be filled with the compressed air so that all the friction clamps 3 holding the electrode 2 (FIG. 2) will move down through a distance $h$. During further clockwise rotation of the shaft 48 (FIG. 6) the displacing cycle of the electrode 2 will be repeated over again.

If the shaft 48 be rotated counterclockwise, the control valves 26 (FIG. 5) will move simultaneously to the extreme left position then return to the right, one after another. This ensures simultaneous lifting of all the friction clamps 3 through a distance $h$ together with the clamped electrode 2 followed by successive downward movement of the friction clamps 3, the electrode 2 being immovable.

To reduce the force applied by each friction clamp to the electrode it is practicable that the claimed device should comprise a large number of friction clamps. The efficiency of such a design will be illustrated by the following example.

In the proposed device with seven friction clamps 3 the force of the spring 17 (FIG. 3) ensuring friction of each of the friction clamps 3 against the electrode 2 will be equal approximately to 0.2 of the weight of the electrode 2 which is three times less than the required friction force of the movable friction clamp in the known devices.

It should be noted that, due to a large area of the working surface of the flexible cushions 18, even if they are relatively not very wide, the working medium for powering the device may be constituted by compressed air from the air supply system provided in industrial enterprises for powering the pneumatic tools. There is no reason to fear a pressure drop at peak consumption in the system since even a pressure of 3 kgf./cm.$^2$ is sufficient for normal functioning of the device. For instance, if the flexible cushion 18 is 150 mm. wide and the diameter of the electrode 2 is 1200 mm., the contact area between the cushion 18 and the flange 16 of the friction clamp 3 will be about half a square meter which corresponds to a force of 15 tons at a pressure of 3 kgf./cm.$^2$. This force is quite sufficient for moving the friction clamps 3 even in the case of three clamps. If seven clamps are provided, the width of the flexible cushion can be reduced to 50 mm., correspondingly reducing the size of the entire device across the diameter.

What we claim is:

1. A device for holding and longitudinally displacing an electrode comprising: a frame; at least three friction clamps movably supported within said frame, said friction clamps extending about the electrode and adapted to clamp the latter; means for moving said clamps in a compressed state along the electrode and relative to the frame; individual power drive means connected to each of said friction clamps for effecting shifting movement thereof; and working medium distributor means supplying working media to each of said individual drive means to provide independent control of the forward and reverse travel of the power drive means for each of said clamps.

2. A device according to claim 1, comprising circular flanges formed on the frame and on each of said friction clamps, the flanges of each friction clamp being located between the frame flanges; and flexible circular cushions being provided on the top and on the bottom of said clamp flanges, said flexible circular cushions being each connected to said working medium distributor means.

3. A device according to clam 2, said working medium distributor means comprising a casing having a sealed chamber for supplying said working medium, said chamber having a cover provided with three holes for operating the power drive means of each friction clamp; and control valves in said chamber corresponding in number to the friction clamps.

4. A device according to claim 3, said working medium distributor means including two groups of two-chambered piston cylinders arranged symmetrically relative to the chamber, said cylinders being operatively connected to said control valves; a rod connecting the piston of each cylinder in one group with the piston of a symmetrically positioned cylinder in the other group, said rod having a middle portion connected with one of the control valves; the upper piston spaces in the cylinders of each group being interconnected in series by channels, and the lower piston spaces in the cylinders of each group being interconnected by channels extending in parallel.

5. A device according to claim 4, comprising two auxiliary two-position control valves positioned within the casing of said working medium distributor means, said control valves being each connected through channels with the upper piston space of one cylinder in one group, with the lower piston spaces of all of the cylinders, and with channels for inlet and egress of the working medium.

6. A device according to claim 5, the casing of said working medium distributor means including two channels providing for the supply of the working medium into the distributor chamber and into one of the auxiliary two-position control valves; and non-return valves being positioned in the inlet openings of the channels in the distributor chamber.

7. A device according to claim 6, comprising means for mechanically linking each of the auxiliary two-position control valves with one of said friction clamps for shifting said control valves at the extreme operative positions of the friction clamp.

8. A device according to claim 3, said casing of the working medium distributor means comprising a device for operating each of the control valves, said device including a rod, a spring wound about said rod, one end of the rod being connected with the control valves; a cam supporting the other end of said rod, the number of the rods and cams corresponding to the number of the control valves; and a single rotatable shaft mounting all of said cams.

9. A device according to clam 8, each said cam having two circular cylindrical edges and two identical interconnecting edges located between the cylindrical edges, one of the interconnected edges on all of said cams being spatially arranged in identical relationship with the shaft axis, and the lengths of the cylindrical edges of all of said cams being different.

References Cited

UNITED STATES PATENTS

| | | | |
|---|---|---|---|
| 2,753,388 | 7/1956 | Bjerkas | 13—16 |
| 2,778,865 | 1/1957 | Wongsgarden | 13—16 |
| 2,884,475 | 4/1959 | Foyn | 13—16 |

ROY N. ENVALL, JR., Primary Examiner